April 14, 1925.
F. S. MALM
1,533,197
MANUFACTURE OF SPONGE RUBBER ARTICLES
Filed Feb. 28, 1923
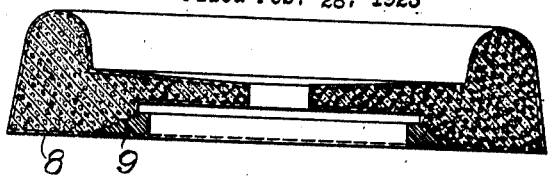
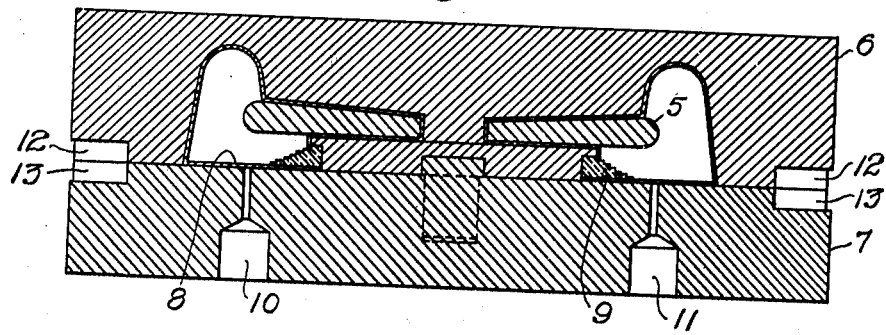
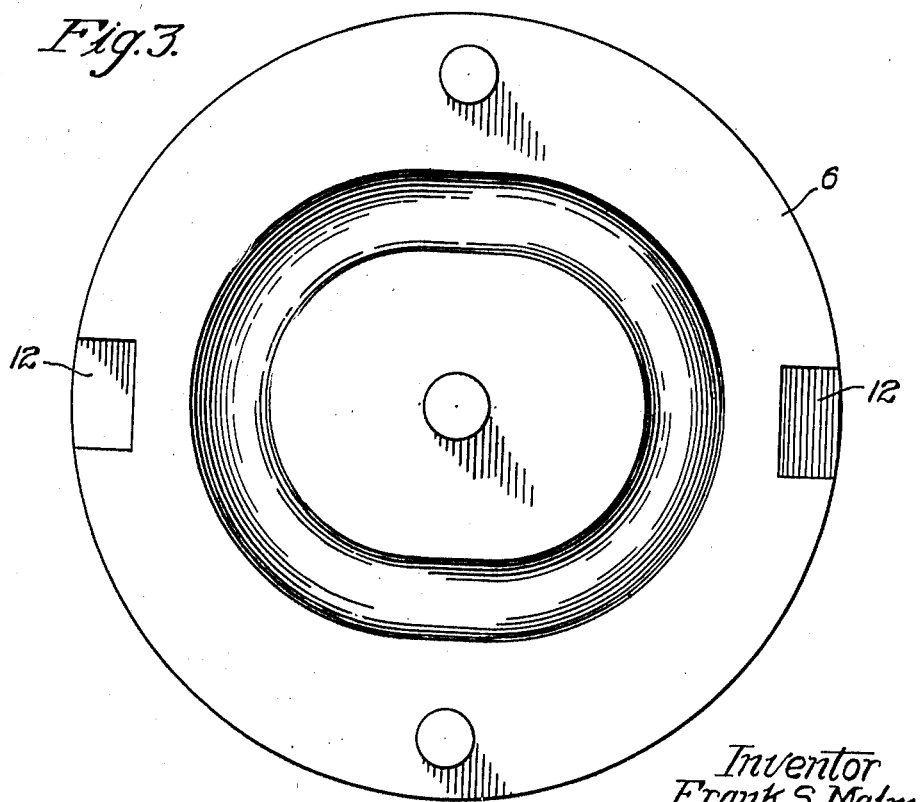
Inventor
Frank S. Malm
by H. A. Pattison
Atty.

Patented Apr. 14, 1925.

1,533,197

UNITED STATES PATENT OFFICE.

FRANK S. MALM, OF CHICAGO, ILLINOIS, ASSIGNOR TO WESTERN ELECTRIC COMPANY, INCORPORATED, OF NEW YORK, N. Y., A CORPORATION OF NEW YORK.

MANUFACTURE OF SPONGE RUBBER ARTICLES.

Application filed February 28, 1923. Serial No. 621,751.

*To all whom it may concern:*

Be it known that I, FRANK S. MALM, a citizen of the United States, residing at Chicago, in the county of Cook and State of Illinois, have invented certain new and useful Improvements in the Manufacture of Sponge Rubber Articles, of which the following is a full, concise, clear, and exact description. This application is a continuation in part of my co-pending application, Serial No. 279,171, Patent No. 1,484,731, filed February 25, 1919.

This invention relates to sponge rubber articles, and more particularly to ear pieces for aviators' telephone head sets and the manufacture thereof.

The invention has for its object the protection of sponge rubber articles from deterioration by oxidation and to better adapt such articles when used in aviators' telephone head sets or the like for contact with the human skin.

In accordance with the general features of this invention the sponge rubber articles are provided with an outer coating of smooth surfaced rubber which is applied thereto in the process of the manufacture of the articles.

In the preferred form of the invention the coating for the articles is applied in the molding or forming and vulcanizing steps by which the body is produced.

This may be accomplished by covering the interior surface of the mold with a coating of rubber compound which will, on formation and vulcanization of the sponge rubber body, become attached thereto to form the coating surface of the article.

In the drawings in which this invention is illustrated in connection with a receiver ear piece for aviators' head sets Fig. 1 is a cross-sectional view of the completed article;

Fig. 2 is a cross-sectional view of the mold showing parts in place prior to the forming and vulcanization processes, and Fig. 3 is a plan view and one section of the mold indicating the form of the article.

In the practice of the processes of this invention the body portion of the article is formed of a rubber composition containing substantially the following ingredients in the proportions given:—

| | Per cent. |
|---|---|
| Smoked sheet rubber, approximately | 37.000 |
| Coucho rubber | 28.375 |
| Ammonium carbonate | 17.625 |
| Vermillion English pale | 4.250 |
| Barytes | 6.500 |
| Sulphur | 4.250 |
| Paraffin | .500 |
| M. R. substitute | .500 |
| Accelerator | 1.000 |

While this composition may be varied both as to the ingredients and amounts, the one given has been found to produce an article which satisfactorily meets special requirements for articles of this kind.

The M. R. substitute may be any suitable asphaltic compound. The accelerator may be either organic or inorganic, such as magnesium oxide or basic amino compound.

The Coucho rubber is included in this compound to facilitate the workability of the mixture; the sulphur for the vulcanizing agent; the barytes is a filler which in the colored articles is used to control the shades; the paraffin and M. R. substitute facilitate the mixing of the compound and also retard oxidation of the finished product, and ammonium carbonate is used to obtain the gas generated to produce the cellular structure of the compound.

It will usually be found preferable to add the ammonium carbonate to the batch just prior to its use, and in order to facilitate the blowing of the batch a suitable volatile rubber solvent, preferably benzol, is added with the ammonium carbonate. The benzol or other volatile rubber solvent renders the batch more plastic, so that the volatile ingredients of the rubber solvent and ammonium carbonate can more easily force the soft compound into all cavities of the mold, thereby facilitating the formation of a perfectly molded part. It is found preferable with a batch including ingredients in the proportions above noted to include approximately ten per cent of the benzol or other volatile rubber solvent.

The composition of the above description is thoroughly mixed, and the blank 5 formed therefrom is placed between upper and lower mold members 6 and 7.

Prior to the placing of this blank 5 in the molds, however, the inner surfaces of the mold members 6 and 7 have been treated or painted with a coating 8 of a composition similar to that of the blank 5 with the exception that the ammonium carbonate or other gas forming ingredient has been omitted.

Also there has been placed upon the lower mold member 7 a soft solid ring member 9 having serrated edges and which ring has been given a primary vulcanizing in a soft metal mold. With the several elements in the mold the two members 6 and 7 are clamped together and the loaded molds are put into a vulcanizer, to which compressed air is admitted, and the vulcanizing period started and continued for approximately four hours at an air pressure of 55 pounds per square inch, the steam pressure in the jacket being maintained at approximately 110 pounds pressure per square inch.

During the early period in the vulcanizer the ammonium carbonate decomposes and is broken down into gases which escape from the compound in the molds which are vented, as indicated at 10 and 11, and cause the cellular structure of the rubber which gives to it its spongy characteristics.

The air pressure in this case retards the too rapid escape of gases which are to cause sponging, prevents entire volatilization of the solvent, and serves also to retard the compound which is plastic at this temperature from escaping through the vents 10 and 11 in the molds. This pressure, however, does not prevent the ultimate escape of the ammonium carbonate gases or of the benzol gases.

The coating or layer 8 of the rubber compound to which the interior of the mold is treated, the blank 5, and the ring 9 being in a plastic condition, will become closely adherent as the blank 5 expands in response to the generation of the gases from the ammonium carbonate, and these several parts will, upon vulcanization, become securely fastened to produce the finished article in the form desired.

The smooth coated surface of the article not only prevents the accumulation of foreign matter in the cellular structure, which would be detrimental when used in contact with the human skin, but it also prevents the oxidation and deterioration of the relatively thin walls separating the cells of the structure, which would occur if these walls were exposed directly to the air.

Openings or notches 12 and 13 are provided in the mold members 6 and 7 for the insertion of tools for separating the molds after the several steps of the process have been completed.

What is claimed is:

1. A process for the manufacture of a spongy rubber material, comprising mixing together rubber, a vulcanizing agent, a gas producing substance, a volatile rubber solvent, an accelerator and then vulcanizing said composition.

2. A process for the manufacture of a spongy rubber material, comprising mixing together rubber, a vulcanizing agent, a gas producing substance, a volatile rubber solvent, and magnesium oxide, and then vulcanizing said composition.

3. A process for the manufacture of a spongy rubber material, comprising mixing together rubber, a vulcanizing agent, a gas producing substance, an accelerator and benzol, and then vulcanizing said composition.

4. A process for the manufacture of a spongy rubber material, comprising mixing together smoked sheet rubber, sulphur, ammonium carbonate, a filler, an accelerator and a volatile rubber solvent, and then vulcanizing said material.

5. A process for the manufacture of a spongy rubber material, comprising mixing together smoked sheet rubber, sulphur, ammonium carbonate, a filler, an accelerator, and benzol, and then vulcanizing said material.

6. A process for the manufacture of a spongy rubber material, comprising mixing together smoked sheet rubber, sulphur, ammonium carbonate, a filler, magnesium oxide, and a volatile rubber solvent, and then vulcanizing said composition.

7. A process for the manufacture of spongy rubber material, comprising mixing together:

| | | Per cent. |
|---|---|---|
| Rubber | about | 65⅜ |
| Ammonium carbonate | " | 17⅝ |
| Filler | " | 11¾ |
| Sulphur | " | 4¼ |
| Magnesium oxide | " | 1 | and then adding to the mixture benzol about 10%.

8. The herein described method of making sponge rubber articles, consisting first in the formation of a composition of smoked sheet rubber, a vulcanizing agent, a filler, a gas producing substance, an accelerator and a volatile rubber solvent, locating the composition within a mold, the composition but partially filling the mold, then vulcanizing the composition in the mold, causing it to swell or expand and fill the mold and creating within the composition a large number of cells.

9. The herein described method of making sponge rubber articles, consisting first in the formation of a composition of smoked sheet rubber, sulphur, ammonium carbonate, a filler, and magnesium oxide in substantially the proportions stated, then locating said composition in a mold provided with openings for the escape of gases, partially filling the mold, and then vulcanizing the composition in the mold.

10. The herein described method of making sponge rubber articles, consisting first in the formation of a composition of smoked sheet rubber, sulphur, ammonium carbonate, barytes or similar material, and an accelerator such as magnesium oxide in substantially the proportions stated, then locating said composition in a mold provided with openings for the escape of gases, partially filling the mold, and then vulcanizing the composition in the mold.

In witness whereof, I hereunto subscribe my name this 14 day of February A. D., 1923.

FRANK S. MALM.